US008401005B2

(12) United States Patent
Zhu et al.

(10) Patent No.: US 8,401,005 B2
(45) Date of Patent: Mar. 19, 2013

(54) SESSION INITIATION PROTOCOL MESSAGE CONTENT PROCESSING METHOD AND NETWORK

(75) Inventors: Lei Zhu, Shenzhen (CN); Long Luo, Shenzhen (CN); Yajuan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1367 days.

(21) Appl. No.: 12/044,798

(22) Filed: Mar. 7, 2008

(65) Prior Publication Data

US 2008/0170563 A1 Jul. 17, 2008

Related U.S. Application Data

(63) Continuation of application No. PCT/CN2006/002313, filed on Sep. 7, 2006.

(30) Foreign Application Priority Data

Sep. 7, 2005 (CN) .......................... 2005 1 0098650

(51) Int. Cl.

*H04L 12/66* (2006.01)
*H04L 12/28* (2006.01)
*H04L 3/16* (2006.01)
*H04M 1/00* (2006.01)

(52) U.S. Cl. ..................... 370/352; 370/395.2; 370/465; 379/373.02; 379/374.01

(58) Field of Classification Search ............... 370/395.2, 370/465; 379/207.16, 373.02, 374.01
See application file for complete search history.

(56) References Cited

U.S. PATENT DOCUMENTS

| | | | | |
|---|---|---|---|---|
| 2002/0106074 | A1 * | 8/2002 | Elliott | 379/372 |
| 2004/0083291 | A1 | 4/2004 | Pessi et al. | |
| 2004/0111476 | A1 * | 6/2004 | Trossen et al. | 709/206 |
| 2005/0100008 | A1 * | 5/2005 | Miyata et al. | 370/389 |

FOREIGN PATENT DOCUMENTS

| | | |
|---|---|---|
| CN | 1398103 | 2/2003 |
| CN | 1469585 | 1/2004 |
| EP | 1248440 | 10/2002 |
| WO | WO-2004100470 | 11/2004 |

OTHER PUBLICATIONS

Lin, Zheng, 2002. "The key technology in softswitch". Communications World 19: 38-39.

Chinese Office Action and Partial Translation received in Chinese Application No. 200510098650.5, mailed Jun. 15, 2007, 6 pages.

"Push to Talk Over Cellular (PoC)—Architecture," Open Mobile Alliance, Candidate Version 1.0, Aug. 5, 2005, 174 pages.

(Continued)

*Primary Examiner* — Chandrahas Patel
*Assistant Examiner* — Joel Hamel
(74) *Attorney, Agent, or Firm* — Slater & Matsil, L.L.P.

(57) ABSTRACT

In a method for processing contents of a Session Initiation Protocol (SIP) message, a SIP sender sends a SIP message, and a SIP network content processing entity sets the message contents of the SIP message based on an acquired management strategy for the message content. A network for processing contents of a SIP message is also provided. Message contents of the SIP message may thereby be changed in the SIP message in accordance with the user's will and the strategy of the operator.

21 Claims, 8 Drawing Sheets

OTHER PUBLICATIONS

International Search Report and Translation received in the Patent Cooperation Treaty Application No. PCT/CN2006/002313, mailed Dec. 28, 2006 , 4 pages.

Handley, M., et al., "SDP: Session Description Protocol," Network Working Group, Request for Comments: 2327, Category: Standards Track, Apr. 1998, 42 pages.

Rosenberg, J., et al., "SIP: Session Initiation Protocol," Network Working Group, Request for Comments: 3261, Obsoletes: 2543, Category: Standards Track, Jun. 2002, 269 pages.

Written Opinion of the International Searching Authority, PCT Application No. PCT/CN2006/002313, Applicant: Huawei Technologies Co., LTD., et al., Mailing date: Dec. 28, 2006, 3 pages.

European Office Action, European Application No. 06 775 622.1-1244, Applicant: Huawei Technologies Co., Ltd., Dated Mar. 29, 2010, 5 pages.

European Office Action, European Application No. 06 775 622.1-1244, Applicant: Huawei Technologies Co., Ltd., Dated Jun. 24, 2011, 6 pages.

* cited by examiner

SESSION INITIATION PROTOCOL MESSAGE CONTENT PROCESSING METHOD AND NETWORK

CROSS REFERENCE TO RELATED APPLICATIONS

This application is a Continuation of PCT/CN2006/002313 filed Sep. 7, 2006, and claims the benefit of Chinese Patent Application No. 200510098650.5 filed on Sep. 7, 2005, both of which are incorporated by reference in their entireties herein. The PCT application published in Chinese as WO2007/028336 A1.

FIELD OF THE INVENTION

The present invention relates to the communication field and in particular to a method and network for processing contents of a Session Initiation Protocol (SIP) message.

BACKGROUND OF THE INVENTION

The SIP is a VoIP signaling protocol proposed by the Internet Engineering Task Force (IETF). The SIP is used to initiate a session, control establishment and termination of a multimedia session with a plurality of participants, and dynamically adjust and modify attributes of the session, such as a bandwidth requirement of the session, the type of transmitted media (voice, video, text, etc.), encoding and decoding format of the media, the support for multicast and unicast. In an IP multimedia Subsystem (IMS), the SIP protocol is adopted as a signaling control protocol for an IP multimedia session.

Standardization organizations, such as the 3rd Generation Partnership Project (3GPP) and the 3rd Generation Partnership Project 2 (3GPP2), have proposed IMS architectures, for the purpose of implementing various multimedia applications through a standardized open framework in a mobile network to provide more choices and colorful experience for a User Equipment.

In the 3GPP Release 5 (R5) phase, the introduced IMS is deployed over a packet domain network, and consists of such function entities as a Call Session Control Function (CSCF) module, a Media Gateway Control Function (MGCF) module, a Multimedia Resource Function (MRF) module and a Home Subscriber Server (HSS). The CSCF may be further divided into three logical entities of a Serving CSCF (S-CSCF), a Proxy CSCF (P-CSCF) and an Interrogating CSCF (I-CSCF). The S-CSCF is a service switching center of the IMS for performing session control, maintaining a session status, managing information of the User Equipment and generating charging information; the P-CSCF is an access point for a User Equipment to access the IMS, and is adapted for accomplishing registration of the User Equipment, controlling Quality of Service (QoS) and implementing security management; and the I-CSCF is adapted for intercommunicating with the IMS domains, managing allocation of S-CSCF, concealing the topology structure and configuration of the network from the outside, and generating charging data. The MGCF is adapted for controlling a gateway and intercommunicating with IMS networks. The MRF is adapted for providing media resources such as a ring tone, a codec and a multimedia conference bridge. The HSS is a subscriber database for storing subscription information, configuration information of IMS subscribers, etc.

During a negotiation on the establishment of a multimedia session based upon the SIP protocol, there is a demand for carrying multimedia information in a session negotiation message and providing other multimedia information in addition to signaling during the session negotiation. The multimedia information carried in the session negotiation message can be added by the initiator of the session, or can be obtained from multimedia resources of a network entity.

SIP protocol messages include, for example, a SIP INVITE message, a SIP REFER message, a SIP MESSAGE message, a SIP INFO message, a SIP OPTION message, a SIP 2XX OK message, and a SIP 1XX message, etc.

The SIP protocol message supports embedding various types of message contents into the message, and the embedded message contents may be a text, a picture, a video clip, a sound file and/or an executable program. Some message contents related to the session, such as a piece of text or a reference to the message contents, may be embedded into the message header.

For example, in the prior art, a ring tone file is stored in a User Equipment in the form of a sound file, and if the receiving User Equipment receives and accepts an INVITE message, the receiving User Equipment plays the ring tone file.

In a first prior art, a ring tone is stored in a User Equipment, and no ring tone file or play program is stored in an INVITE message and a SIP 180 (Ring) message. Instead, a ring tone to be played is selected by the User Equipment in accordance with the setting of a subscriber. No network entity in a SIP network provides the SIP User Equipment with a ring tone file. Instead, the ring tone file is stored in the User Equipment.

Various individualized ring tones provided in the first prior art are fully dependent upon ring tone files stored in the User Equipment. Therefore, neither the individualized ring tone provided for the present session by the SIP network nor operation by the operator and the network on multimedia information of the session may be embodied.

In a second prior art, as specified in the IMS specification, an MRF may act as a multimedia resource and play a ring tone for a receiving User Equipment during a session negotiation. In FIG. 1, a schematic diagram of a flow in which an MRF plays a ring tone for a receiving User Equipment is shown. As specified in the IMS specification, a connection is established between the MRF and the receiving User Equipment, so that the MRF may play a multimedia ring tone for the receiving User Equipment.

The solution of the second prior art causes many processes to be added during the session negotiation, and multimedia information provided by the MRF for the receiving User Equipment includes only a ring tone, which may be tedious because no other multimedia content or application program can be provided. From the view of system performance optimization, the session negotiation of this method is rather time-consuming, but few functions can be obtained. Furthermore, the message content of a SIP message are defined in the prior art, and an application server for message contents of the SIP message generated by a SIP message initiator may not process new media contents, which is also a drawback.

For the purpose of transmitting only media contents, some network resources may be still consumed due to the size of the media contents. In some cases, however, if a client or a server stores the media contents, during the actual transmission, it is also possible that no actual media resource but just a reference recognized by both parties is transferred, and a receiver may retrieve the media contents in accordance with the reference. And thereby the utilization rate of network resources is improved. The media contents and the reference to the media contents carried in a SIP message are referred to a media component. Furthermore, in a method for transferring media contents or a reference to the media contents, the addition of abundant media contents or a reference may be managed in accordance with an operator policy or subscriber subscription or the setting in the subscription.

SUMMARY OF THE INVENTION

A method for processing contents of a SIP message is provided. Through the method of the invention, various multimedia components and service support capabilities information may be provided in a SIP message.

In view of the above, a method for processing contents of a SIP message is provided, which includes the steps of:

A. sending, by a SIP message sender, a SIP message; and

B. setting, by a SIP network content processing entity, message contents of the SIP message in accordance with a message contents management policy.

The setting message contents of the SIP message portion of step B includes the step of:

setting a media component in the SIP message.

Preferably, the media component is media contents, the setting action in step B includes adding and/or modifying, and the step B further includes the step of:

determining, by the SIP network content processing entity, whether the message content management policy allows the media contents in the SIP message to be added and/or modified, and if the message content management policy allows the media contents in the SIP message to be added and/or modified, adding and/or modifying corresponding media contents in the SIP message in accordance with media contents information carried in the SIP message.

Step A preferably includes the step of:

sending, by the SIP message sender, the SIP message carrying a request for adding and/or modifying the media contents and a reference to the media contents.

In step B, corresponding media contents are added and/or modified in accordance with the request and the reference carried in the SIP message.

Preferably, the reference to the media contents is a serial number of the media contents or a Uniform Resource Identifier (URI) of the media contents.

Step A preferably includes the step of:

sending, by the SIP message sender, the SIP message.

In step B, the SIP network content processing entity adds and/or modifies corresponding media contents in the SIP message in accordance with the beforehand setting in the SIP network content processing entity.

The inventive method also further preferably includes the steps of:

sending in advance, by a User Equipment, a setting message to the SIP network content processing entity, and determining, by the SIP network content processing entity, whether the setting carried in the message is valid, and storing the setting if the setting carried in the message is valid.

The media contents and a corresponding relationship between the media contents and the reference thereof are stored in advance in a SIP network content processing entity, and step A preferably includes the step of:

sending, by the SIP message sender, the SIP message carrying a request for adding and/or modifying the media contents and a reference to the media contents.

In step B, corresponding media contents are added and/or modified in accordance with the request and the reference carried in the SIP message.

Preferably, the SIP network content processing entity is an entity to which the SIP message sender pertains or an entity to which a SIP message receiver pertains.

The media component is preferably a media content, the setting includes deleting, and step B preferably includes the steps of:

determining, by the SIP network content processing entity, whether the message content management policy allows the media contents in the SIP message to be deleted, and deleting corresponding media contents in the SIP message in accordance with a prescription in the message content management policy if the message content management policy allows the media contents in the SIP message to be deleted.

The method preferably further includes the step of adding or modifying the media component after deleting corresponding media contents.

The step of deleting the media contents includes the step of:

deleting directly the media contents.

The method further includes the step of:

sending, by the SIP network content processing entity, the media contents to a User Equipment through an E-mail, a Multimedia Messaging Service (MMS) or a Short Message Service (SMS); or, viewing or obtaining, by the User Equipment, the media contents from a WEB page.

The step of deleting corresponding media contents includes the step of:

deleting corresponding media contents that are not supported by a receiver.

The method preferably further includes the steps of:

setting media contents that are not supported by the receiver in the setting of the subscriber; or providing a SIP network with information on media contents supported by a User Equipment of the receiver during a registration with the SIP network.

The step of adding the media component includes the step of adding new media contents in the SIP message.

The SIP message receiver stores in advance the media contents and a corresponding relationship between the media contents and the reference thereof, and the step of adding the media component includes the step of adding a reference corresponding to the new media contents to the SIP message;

After the SIP message receiver receives the SIP message, the method further includes the steps of:

fetching, by the SIP message receiver, corresponding media contents in accordance with the reference in the SIP message, and playing the media contents.

The media component is a reference to the media contents, the setting step includes adding, and step B includes the steps of:

determining, by the SIP network content processing entity, whether the message content management policy allows adding of the reference to the media contents to the SIP message, and adding the reference to corresponding media contents to the SIP message in accordance with the policy if the message content management policy allows adding of the reference to the media contents to the SIP message;

After the SIP message receiver receives the SIP message, the method further includes the steps of:

fetching, by the SIP message receiver, corresponding media contents in accordance with the reference in the SIP message, and playing the media contents.

A reference to the media contents is stored in the message body or is stored as information in the header of the message.

Between step A and step B, the method further includes the step of obtaining, by the SIP network content processing entity, the message content management policy upon receipt of the SIP message.

The SIP message sender is provided with a SIP network content processing entity to which the SIP message sender pertains, and the SIP message receiver is also provided with a SIP network content processing entity to which the SIP message receiver pertains, and the SIP network content processing entity is the SIP network content processing entity to which the SIP message sender pertains or the SIP network content processing entity to which the SIP message receiver pertains.

The SIP message sender is provided with a SIP network content processing entity to which the SIP message sender pertains, and the SIP message receiver is also provided with a SIP network content processing entity to which the SIP message receiver pertains, and the SIP network content processing entity to which the SIP message sender pertains and the SIP network content processing entity to which the SIP message receiver pertains each perform step B sequentially.

The message content management policy is to restrain message contents from being sent to a SIP message receiver.

The step of setting the message contents of the SIP message in step B includes the step of deleting the message contents carried in the SIP message, which are restrained from being sent to the SIP message receiver.

The method preferably further includes the steps of:

storing, by the SIP network content processing entity, the deleted message contents, and obtaining, by the SIP message receiver, the deleted message contents through a transmission approach other than the SIP message after deleting the message contents.

The message content management policy includes at least one of an operator policy, subscriber subscription information and the setting based on the subscriber subscription information.

The SIP message may be an INVITE message.

Preferably, the content processing entity in the SIP network may be a CSCF module, an MRF module, an Application Server (AS) or a Media Gateway.

Preferably, the Application Server may be a Push-To-Talk over Cellular (PoC) server controlling a PoC service function (a PoC server performing a controlling function), a PoC server controlling a PoC session participant (a PoC server performing a participating function), a Conference Server, a Service Capability Interaction Manager (SCIM), a Presence Server, or a Converged IP Messaging server (CPM server).

Preferably, the media contents may be a text, a sound file, a video clip, an audio medium, an animation, or an executable program.

A network for processing contents of a SIP message is provided, which includes User Equipment in communication with a SIP network and a SIP network content processing entity. The SIP network content processing entity includes:

a media information setting unit adapted to set message contents of a SIP message sent from the User Equipment in accordance with content management policy information.

Preferably, the network content processing entity may be a CSCF module, an MRF or an Application Server.

Preferably, the Application Server may be a PoC server controlling a PoC service function (a PoC server performing a controlling function), a PoC server controlling a PoC session participant (a PoC server performing a participating function), a Conference Server, an SCIM or a CPM server.

The SIP network content processing entity may be located in a SIP network to which a sender of the SIP message pertains, a SIP network to which the receiver of the SIP message pertains, a SIP network to which both the sender and the receiver of the SIP message pertain, or an intermediate SIP network over which the SIP message traverses.

The network further includes a content management policy obtaining unit adapted to obtain and provide the message content management policy information of a subscriber to the media information setting unit.

The invention has the following advantageous benefits.

The invention implements a method for utilizing different types of message contents in a SIP message, so that a network entity (for example, an Application Server) in a SIP network, particularly in an IMS network may use message contents in a SIP session negotiation message in accordance with an operator policy, subscription information of a subscriber or setting of the subscriber. The used message contents include a media component. The media component includes media contents and a reference to the media contents. Service supporting capability information includes, for example, media parameters, coding parameters, which are described in a prescribed manner, and the service capability information may be described in other description means in a SIP message. The media contents may be text, a ring tone file, a video media clip, an audio media file, an animation and an executable program. The network entity in the SIP network provides media contents so as to provide information for a subscriber participating in a session negotiation during the session negotiation. In a method of adding, deleting and modifying media contents, a reference to the media contents may be used. In the invention, a method of adding, deleting and modifying media contents and a reference to the media contents in a SIP message is also disclosed, and contents in the related message are processed in accordance with the operator policy, the subscriber subscription and the setting of the subscriber. Therefore, in the invention, message contents of a SIP message may be changed in accordance with a desire of the initiating and receiving subscribers and the policy of the operator during a session negotiation. The changeable message contents can be various types of media contents. The SIP network may use the information on service supporting capability to provide flexibly service choices in the SIP network in accordance with the policy of the operator and the subscription information of the subscriber for the convenience of the subscriber.

BRIEF DESCRIPTION OF THE DRAWINGS

The invention will become more readily apparent from the Detailed Description of the Invention, which proceeds with reference to the drawings, in which.

DETAILED DESCRIPTION OF THE INVENTION

Embodiments of the invention are described as follows with reference to the accompanying drawings.

Figure 2:
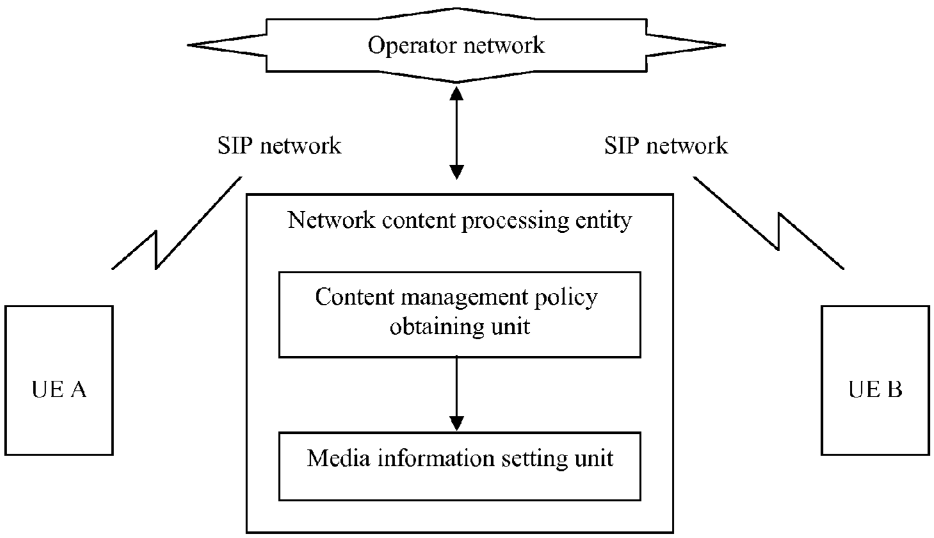
FIG. 2 is a schematic diagram of a network architecture in accordance with the invention.

With reference to FIG. 2, it is a schematic diagram of the architecture of a SIP network system in accordance with an embodiment of the invention. As shown in FIG. 2, the SIP network system includes User Equipment in communication with a SIP network, and a SIP network content processing entity.

In the embodiment of the invention, a network content processing entity is provided with:

a content management policy obtaining unit adapted to receive a SIP message sent by a User Equipment, and to obtain message content management policy information for the subscriber from an operator network; and a media information setting unit adapted to receive the content management policy information sent by the content management policy obtaining unit, and set media information for the SIP message sent by the User Equipment in accordance with the content management policy information.

Also in an alternative embodiment of the invention, the network entity can be provided with only a media information setting unit without influence on implementing the invention.

The network entity herein may be a CSCF, an MRF or an Application Server, and the Application Server herein may be a PoC server controlling a PoC service (a PoC server performing a controlling function), a PoC server participating in controlling a PoC service (a PoC server performing a participating function), a SCIM, a Presence Server, or a CPM server. In the embodiment of the invention, the SIP network content processing entity may be located in a SIP network to which an initiating subscriber pertains or a SIP network to which a receiving subscriber pertains, or a SIP network to which both the initiating subscriber and the receiving subscriber pertain. Furthermore, such a function entity may be located in each of the networks to which the initiating subscriber pertains and the network to which the receiving subscriber pertains. If the initiating subscriber and the receiving subscriber are subscribers in the same network, there is only one function entity; and if they are subscribers in different networks, there is a function entity in each of the networks, instead of sharing the same function entity. Therefore, there are three possible implementations. FIG. 2 shows only one of the possible network architectures, however the other two network architectures are analogous to this and descriptions thereof are omitted herein.

In a message transmission method in accordance with an embodiment of the invention, when sending a SIP message, the sending subscriber sets contents of the SIP message in accordance with an operator policy, subscriber subscription information or information set on the basis of the subscriber subscription information; and the receiving side executes corresponding contents in accordance with the contents of the SIP message, thereby improving the diversity of subscriber services and enhancing experiences of the subscriber.

For a session negotiation message, the network entity in the SIP network may add, modify and delete contents in the message, and the contents in the message may be a media component (media contents and a reference to the media contents).

The media component in message contents may be media contents or a reference to media contents.

If the media component is a reference to media contents, the step of setting the media component may include any one or more of the following:

the sender sends a SIP message which carries neither media content nor reference to media contents;

the sender sends media contents to the SIP network, and the SIP network sends the media contents to the message receiver;

the message sender sends a reference to media contents to the SIP network, and the SIP network adds media contents stored in the network into the SIP message in accordance with the reference;

a reference to media contents is sent from the network to which the sender pertains to the network to which the receiver pertains, and the network to which the receiver pertains adds the media contents stored in the network into the SIP message in accordance with the reference;

the network entity of the SIP network adds media contents or a reference to media contents into a SIP message in accordance with the setting of the network to which the sender pertains;

the SIP network to which the sender or the receiver pertains adds media contents in accordance with a reference to the media contents; and the SIP network sends to the receiving subscriber a reference to media contents, which is stored at a receiver equipment.

In the SIP network, the network entity for adding, modifying and deleting contents and a reference to message contents may be a CSCF, an MRF and a SIP server, where the AS may be a PoC server controlling a PoC service (a PoC server performing a controlling function), a PoC server participating in controlling a PoC service (a PoC server performing a participating function), a Conference Server, an SCIM, a Presence Server or a CPM server; the CSCF is a Proxy-Call Session Control Function (P-CSCF), a Serving-Call Session Control Function (S-CSCF) or an Interrogating-Call Session Control Function (I-CSCF); and the SIP server is an outgoing Border Gateway Control Function (BGCF) or a SIP-Application Layer Gateway (SIP-ALG).

The adding, modifying and deleting of message contents by the network entity in the SIP network may be performed in compliance with the operator policy, a subscriber subscription and the setting of the subscriber, or under the control of the operator policy.

The policy of the operator is derived from the setting of the operator, and may be as follows: the operator suggests that a receiving subscriber operates at a different rate when using a certain parameter configuration, so as to enjoy benefits of activities organized by the operator; the AS adds a parameter for one or more types of subscribers in accordance with the policy of the operator, for example, in case of gold-card subscribers, a parameter is added, otherwise, no parameter is added; the AS adds multimedia contents (an animation, a ring tone, etc.) representing the operator to a session negotiation message sent to the receiver in accordance with the policy of the operator; the network entity in the SIP network adds multimedia advertisement information in a session negotiation message in accordance with the policy of the operator; and a reference to media contents may be used to reduce the size of a SIP message.

Therefore, according to the policy of the operator, the network entity can add compulsorily media contents to a message body of a SIP message, or add compulsorily a reference to media contents to a message header of a SIP message or the message body of the SIP message.

The adding, modifying and deleting of message contents by the network entity in the SIP network may also be in compliance with a subscriber subscription in the SIP network and the setting of the subscriber allowable under the subscription with the SIP network. The subscriber may request the SIP network to add designated media contents to a SIP message. The subscriber may request the SIP network to delete designated media contents.

In the embodiment of the invention, the SIP network content processing entity may obtain a message content management policy upon receipt of a SIP message. Alternatively, a message content management policy may be set on the SIP network content processing entity without influence on implementing the invention.

The method according to embodiments of the invention is described in details below with reference to the embodiments. In the embodiment below, an INVITE message is used as a SIP message. Other message can also be used as a SIP message in other embodiments of the invention without influence on implementing the invention.

The first embodiment: a process of implementing a technical solution in accordance with an embodiment of the invention in a SIP network is illustrated.

Figure 3:
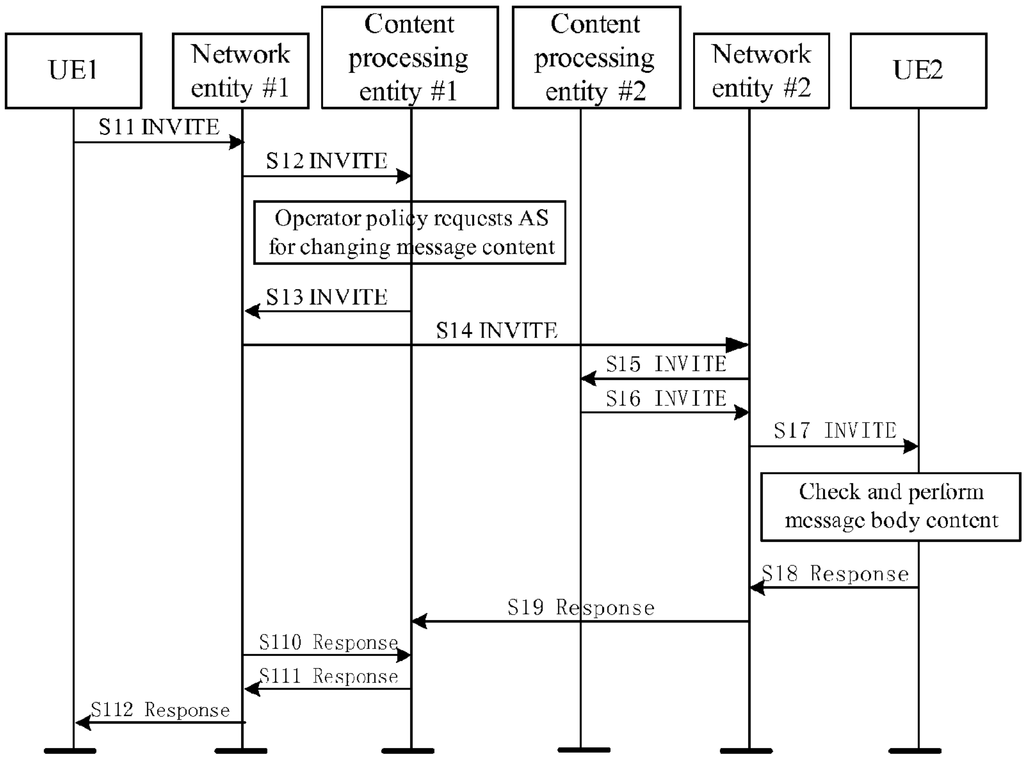
FIG. 3 is a schematic diagram of a flow in accordance with a first embodiment of the invention.

As illustrated in FIG. 3, a process of implementing a technical solution in accordance with the first embodiment of the invention in a SIP network is shown. A content processing entity in the SIP network changes contents of a session negotiation message (an INVITE message as shown).

As illustrated in FIG. 3, the procedure primarily includes the following steps:

S11) An initiating UE1 initiates a session establishment request message (an INVITE message) to the SIP network.

S12) A network entity #1 in the SIP network forwards the session request message to a content processing entity #1 in accordance with contents in the session establishment request message.

The content processing entity #1 is a network entity for processing message contents of a SIP message in the SIP network to which the initiating UE1 pertains, and may be integrated on a network entity such as an application server processing the INVITE message and an S-CSCF; and these entities integrated with the function of the content processing entity may utilize the message contents of the SIP message in accordance with the method of the embodiment of the invention. The content processing entity may change contents in the INVITE message in accordance with a policy of an operator, a subscription of a subscriber and the setting of the subscriber.

S13)-S14) The SIP network forwards the changed session establishment request message to a content processing entity #2.

The content processing entity #2 is a network entity for processing message contents of a SIP message in the SIP network to which a receiving UE2 pertains, and may be integrated on a network entity such as an application server processing the INVITE message, and an S-CSCF; and these entities integrated with the function of the content processing entity can use the message contents of the SIP message in accordance with the method of the embodiment of the invention. The content processing entity can change the contents in the INVITE message in accordance with the policy of the operator, the subscription of the subscriber and the setting of the subscriber.

S15)-S17) The SIP network forwards the changed session establishment request message to the receiving UE2.

The receiving UE2 obtains information on the message contents in the message header of the session establishment request message upon receipt of the session establishment request message, and processes and executes with respect to different parts of the contents in the message respectively. The contents in the message may include the media component and descriptions of service supporting capability information. The service supporting capability information is used by the receiving UE2 to participate in and accomplish a session negotiation mechanism. The media component of the initiating UE1 provides the receiving UE2 with personal and session related information of the initiating UE1, and the media component added, deleted or modified by the content processing entity provides the receiver UE2 with SIP network related information and session related policy information.

S18)-S112) The receiving UE2 generates a response message to the session establishment request, and the SIP network returns the response message to the initiating UE1.

Therefore, during the session negotiation, for the SIP, through adding, deleting and modifying the message contents of the session negotiation message by the message content processing entity, the media component is used in the session negotiation message in accordance with the policy of the operator, the subscriber subscription and the setting of the subscriber.

The session negotiation processing entity herein may be provided separately, or may be integrated in any network entity in the SIP network. If the session negotiation processing entity is integrated in a network entity, this network entity may carry out the session negotiation in accordance with the session negotiation optimization method of the embodiment of the invention.

The SIP network may be a SIP network to which the initiating subscriber and the receiving subscriber pertain; or, the SIP network may be a SIP network to which the initiating subscriber pertains or a SIP network to which the receiving subscriber pertains; or, the SIP network is the SIP network to which the initiating subscriber pertains, a SIP network to which the receiving subscriber pertains and one or more SIP networks traversing between the SIP network to which the initiating subscriber pertains and the SIP network to which the receiving subscriber pertains. In the technical solution of the embodiment of the invention, the method for changing multimedia information in a message in accordance with the policy of the operator may be employed concurrently or separately in the SIP network where the initiating subscriber is located and the SIP network where the receiving subscriber is located. Further in some applications without distinguishing the initiating and receiving networks, this method by which a SIP network changes message contents may also be implemented.

The second embodiment: a logic procedure in which the network content processing entity changes message contents in accordance with the policy of the operator, the subscriber subscription and the setting of the subscriber is shown.

The network content processing entity in the SIP network may check contents of a SIP message upon receipt of the SIP message to determine whether the subscriber requests changing the message contents of the SIP message, and the contents to be checked may be contents in a message header of the SIP message or in a message body of the SIP message. The network content processing entity in the SIP network may change the message contents in accordance with the policy of the operator, the subscriber subscription and the setting of the subscriber.

Figure 4:
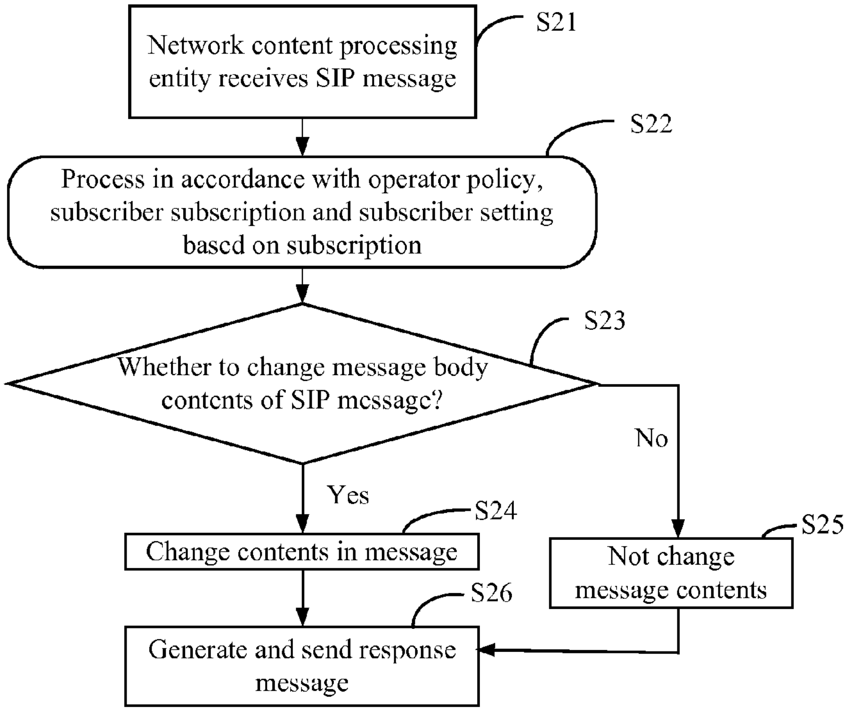
FIG. 4 is a schematic diagram of a flow in accordance with a second embodiment of the invention.

A process of how the network content processing entity for the initiating subscriber changes message contents upon receipt of a SIP message is described below by taking an AS for an example. As illustrated in FIG. 4, a schematic diagram of a flow, in which the SIP network content processing entity processes a SIP message upon the receipt of the SIP message in the cases of the network to which the initiating subscriber pertains and of the network to which the receiving subscriber pertains, is shown. As shown in the figure, the process primarily includes the following steps:

S21) The network content processing entity receives a SIP message.

S22) The network content processing entity processes in accordance with the policy of the operator, the subscriber subscription and the setting of the subscriber.

S23) The network content processing entity determines whether there is a demand for changing message contents of the SIP message, and if there is a demand for changing message contents of the SIP message, the flow proceeds with the step S24; otherwise, the flow proceeds with the step S25.

The network content processing entity checks the contents in the SIP message through process in accordance with the policy of the operator, the subscriber subscription and the setting of the subscriber, to determine whether the subscriber requests changing the message contents of the SIP message. The contents to be checked may be contents in a message header of the SIP message or in a message body of the SIP message.

S24) The message contents are changed and the flow proceeds with the step S26.

The network content processing entity of the SIP network may determine whether to allow and support changing the contents in the message in accordance with the policy of the operator. The network content processing entity may check whether the policy of the operator, in addition to the subscriber, requests changing the message contents in the current SIP message, and determines how to change the message contents in accordance with the policy of the operator.

The SIP network to which the receiving subscriber pertains analyzes the contents of the SIP message upon receipt of the SIP message to check whether the SIP message contents include message contents that are not supported, so that part of the message contents that is not supported by the receiving subscriber may be deleted under the allowance of the policy of the operator.

S25) The message contents are not changed.

S26) A response message is generated and sent.

The third embodiment: The network content processing entity changes multimedia contents in a SIP message.

Figure 5:
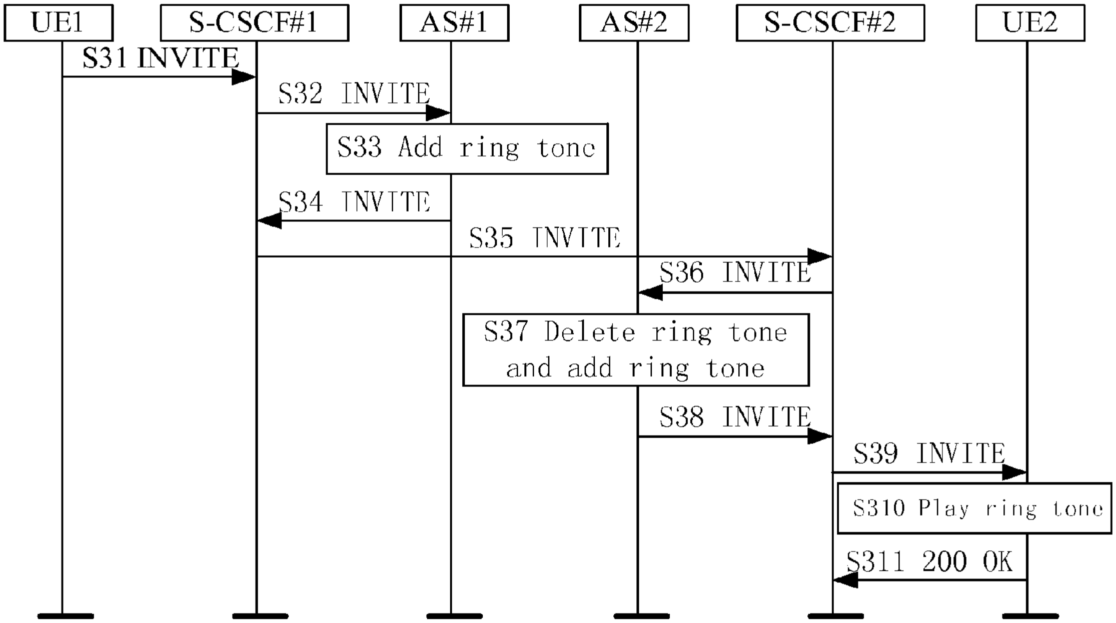
FIG. 5 is a schematic diagram of a flow in accordance with a third embodiment of the invention.

In the third embodiment, it is illustrated how the SIP network changes multimedia information in a session negotiation message in accordance with an embodiment of the invention by an example in which an Application Server in the SIP network changes contents in the session negotiation message by changing a ring tone file in the message in accordance with the policy of the operator and under the control of the policy of the operator. As illustrated in FIG. 5, a schematic diagram of a flow in which the network content processing entity in the SIP network changes a ring tone file in a session negotiation message in accordance with the policy of the operator is shown. In the scenario illustrated in FIG. 4, no ring tone file is added to a session establishment request initiated by the initiating subscriber; however a ring tone file is added to the message by the SIP network in accordance with an indication from the initiating subscriber and sent to the receiving subscriber.

FIG. 5 is a signaling flow chart in which the network content processing entity in the SIP network adds a ring tone and modifies a ring tone in a session negotiation message according to the third embodiment, and entities involved include: the initiating UE1, the receiving UE2, an S-CSCF #1 in the SIP network to which the UE1 pertains, an S-CSCF #2 in the SIP network to which the UE2 pertains, an AS #1 in the SIP network to which the UE1 pertains and an AS #2 in the SIP network to which the UE2 pertains. It is assumed that a ring tone file Sound #1 supported in the SIP network where the UE1 is located is stored in the AS #1, and a ring tone file Sound #2 supported in the SIP network where the UE2 is located is stored in the AS #2. The specific steps are as follows.

S31) The UE1 sends to the S-CSCF #1 a session negotiation request message, i.e., an INVITE message, which carries service supporting capability information of the UE1; via the request message, the UE1 can request the SIP network to add a ring tone file to the message. For example, the UE1 may, via the request message, request the SIP network to add the ring tone file Sound #1, so that the Sound #1 with a ring tone file serial number #1 is added to the message.

S32) The S-CSCF #1 determines in accordance with the INVITE message that the present service will be processed by the AS #1, and forwards the INVITE message to the AS #1.

S33) The AS #1 is instructed that the ring tone file Sound #1 shall be added to the SIP message upon receipt of the INVITE message, and the ring tone file Sound #1 may be added to the INVITE message by the AS #1 in accordance with a request from the subscriber or of the subscription of the subscriber. If the policy of the operator allows the AS #1 to add the ring tone file Sound #1, the AS #1 adds the ring tone file Sound #1 to the INVITE message, and sends to the S-CSCF #1 the INVITE message carrying the Sound #1. If a ring tone file is already present in the SIP message, the AS #1 may determine whether to add, delete or modify the ring tone file in the session negotiation message in accordance with the policy of the operator, the subscription of the subscriber and the subscriber setting based on the subscriber subscription.

S34) The AS #1 sends the INVITE message to the S-CSCF #1.

S35) The S-CSCF #1 sends the received INVITE message to the S-CSCF #2.

S36) The S-CSCF #2 sends the received INVITE message to the AS #2.

S37) The AS #2 checks the Sound #1 in the INVITE message, and determines whether to add, delete or modify a ring tone file in the session negotiation message in accordance with the policy of the operator, the subscription of the subscriber and the subscriber setting based on the subscriber subscription. For example, if the AS #2 discovers that the receiving UE2 does not support playing the ring tone file Sound #1, the AS #2 may choose to delete the ring tone file Sound #1 in accordance with the policy of the operator. If the AS #2 adds the ring tone file Sound #2 to the INVITE message in accordance with the policy of the operator, the subscription of the subscriber and the subscriber setting based on the subscriber subscription, and the AS #2 returns to the S-CSCF #2 a response to the received INVITE message, the session request message may contain the ring tone file Sound #1 and/or Sound #2.

S38) The AS #2 sends the INVITE message to the S-CSCF #2.

S39) The S-CSCF #2 sends the INVITE message to the UE2.

S310) Upon receipt of the INVITE message, the UE2 plays a ring tone to a subscriber who uses the UE2, in addition to negotiating a session, in accordance with the ring tone file carried in the request.

S311) The UE2 returns a response 200 OK to the S-CSCF #2 and executes other operation steps for the session negotiation.

During such a session negotiation, the initiating UE1 sends to the SIP network where the initiating UE1 is located a serial number of the ring tone file Sound #1 to be sent to the receiving UE2, and the AS #1 changes the contents in the message by adding the ring tone file Sound #1 if being allowed by the policy of the operator. In addition, the AS #2 may modify the contents in the session negotiation request message in accordance with the policy of the operator, for example, the AS #2 may add, modify or delete the ring tone file Sound in the request message. Dependent upon whether the UE2 supports the contents in the message, the AS #2 may delete part or all of the contents in the message.

The network content processing entity that adds, deletes and modifies the media contents in the session negotiation request message may be, but not limited to one or more entities of an S-CSCF, a P-CSCF, an AS and an MRF. The media contents to be edited, added or deleted by the network content processing entity may include, but not limited to a ring tone, a picture, a message, a video and an executable program. The network content processing entity may add, delete or modify the media contents simultaneously with the session negotiation without influence on the service supporting capability negotiation.

The fourth embodiment: it is a case that multimedia contents are stored in the User Equipment.

In the case of multimedia contents stored in the User Equipment, the solution of the fourth embodiment allows the SIP network to be aware of the media contents stored in the User Equipment. The SIP network may send to the receiving subscriber a serial number of the media contents stored in the receiving User Equipment, and the receiving User Equipment plays the media contents.

Figure 6:
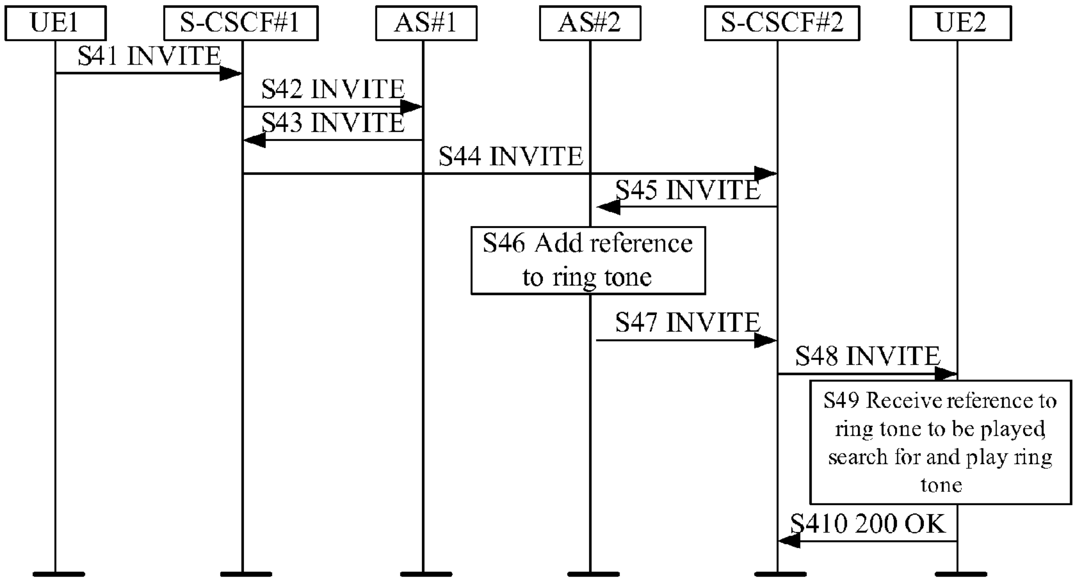
FIG. 6 is a schematic diagram of a flow in accordance with a fourth embodiment of the invention.

FIG. 6 is a schematic diagram of a flow in which the SIP network sends to the receiving subscriber a serial number of media contents stored in the receiving Subscriber Equipment. As illustrated in FIG. 6, the application server uses the serial number #2 of the ring tone stored in the User Equipment in the network, the serial number #2 is carried in a session establishment request message, and the receiving subscriber searches for the ring tone #2 in accordance with the serial number sent from the AS and plays the ring tone #2.

S41) The initiating UE1 sends an INVITE message which may or may not carry media contents or a reference to media contents.

S42) The S-CSCF #1 forwards to the AS #1 the INVITE message which may or may not carry media contents or a reference to media contents.

S43)-S45) The AS #1 forwards to the AS #2 the INVITE request which may or may not carry media contents or a reference to media contents.

S46) The AS #2 receives the INVITE message. The AS #2 may proceed in accordance with the subscriber subscription that, for example, a ring tone may be added for the subscriber, the subscriber setting that, for example, the subscriber sets the ring tone #1 on the User Equipment for listening or the operator policy that, for example, the ring tone #2 is played for an Easyown subscriber of the China Mobile Communications Corporation. In this case, the AS #2 sends the reference to the ring tone #2 to the UE2 in accordance with the subscriber setting.

S47)-S48) The AS #2 sends the INVITE message carrying the reference to the ring tone #2 to the UE2.

S49) The receiving UE2 receives the INVITE message; and if accepting the request, the receiving UE2 searches for a ring tone #2 player program on the UE2 and plays the ring tone #2.

S410) The subsequent process is completed in accordance with the session establishment flow.

The fifth embodiment: a process in which the initiating subscriber sends a reference to media contents is illustrated.

Figure 7:
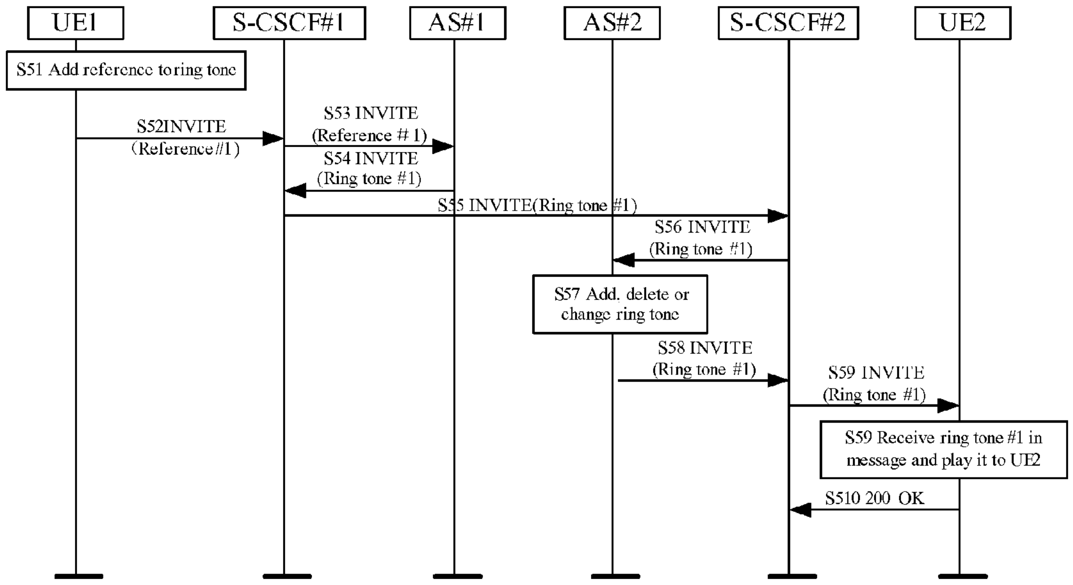
FIG. 7 is a schematic diagram of a flow in accordance with a fifth embodiment of the invention.

As illustrated in FIG. 7, a process in which the initiating subscriber sends a reference to a ring tone and the network adds media contents is shown.

In this embodiment, the initiating UE1 adds the reference #1 of the ring tone #1 stored in the AS #1 to a session establishment request to be sent. Upon receipt of the INVITE message carrying the reference #1, the application server AS #1 checks whether the policy of the operator includes a policy of adding, deleting and modifying a ring tone, checks whether there is a setting related to ring tone addition, deletion and modification with respect to the UE1, and checks whether the subscriber subscription information requests the AS #1 to add, delete and modify a ring tone in the message. The AS #1 adds the ring tone #1 in accordance with the reference #1 and changes the ring tone in the message in accordance with the policy of the operator, the subscription of the subscriber and the setting of the subscriber, The AS #1 forwards the generated message to the AS #2 in the network where the receiving subscriber UE2 is located.

S51) The UE1 needs to call the UE2, and adds a reference to a ring tone #1 in an INVITE message, for the purpose that the UE2 may accept the session request with pleasure whiling listening to the ring tone provided by the UE1 upon receipt of the INVITE message.

S52) The S-CSCF #1 receives the INVITE message sent by the UE1 and forwards the INVITE message to the AS #1.

S53) Upon receipt of the INVITE message, the AS #1 determines whether to add, delete and modify the ring tone and/or the reference to the ring tone in the INVITE message in accordance with the policy of the operator, the subscriber subscription of the UE1 and the subscriber setting based on the subscription. In the present embodiment, the AS #1 determines that the subscription of the subscriber allows a ring tone to be added to the INVITE message, the subscriber does not set addition, deletion or modification of a ring tone, and the operator has no policy of deleting a ring tone or a reference to a ring tone in the INVITE message. Therefore, the AS #1 adds the ring tone #1 to the INVITE message in accordance with the reference #1 of the ring tone #1 in the INVITE message.

S54)-S56) The AS #1 sends to the AS #2 the INVITE message carrying the ring tone #1.

S57) The AS #2 receives the INVITE message, and determines whether to add, delete and modify the ring tone and/or the reference to the ring tone in the INVITE message in accordance with the policy of the operator, the subscriber subscription of the UE1 and the setting of the subscriber. In the present embodiment, the policy of the operator allows the INVITE message carrying the ring tone #1 to be sent to the UE2, and has no policy of adding, deleting or modifying the INVITE message; the subscriber subscription of the UE2 allows the UE2 to receive the INVITE message carrying the ring tone #1; and the AS #2 has no subscriber setting of deleting and/or changing the ring tone #1. Therefore, the AS #1 forwards to the UE2 the INVITE message carrying the ring tone #1.

S58)-S59) The network forwards to the UE2 the INVITE message carrying the ring tone #1.

S510) The UE2 receives the INVITE message, and plays the ring tone #1 if it accepts the INVITE message.

S511) The subsequent process is completed in accordance with the session establishment flow.

The sixth embodiment: a process in which a reference is transferred to the receiving network is shown.

Figure 8:
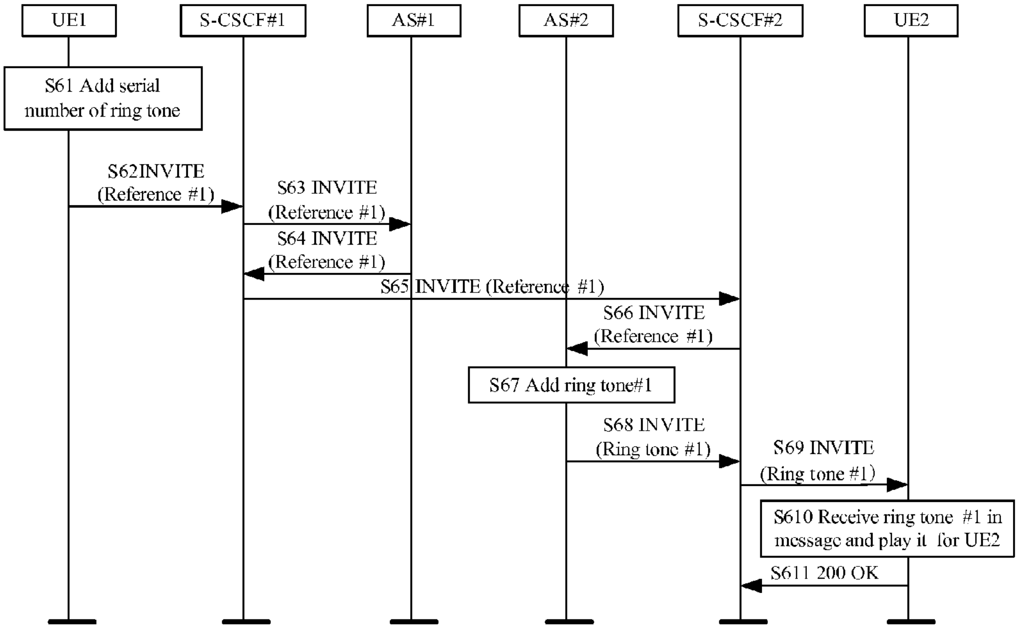
FIG. 8 is a schematic diagram of a flow in accordance with a sixth embodiment of the invention.

As illustrated in FIG. 8, the reference #1 of network-supportable media contents that is sent from the initiating subscriber is sent to the network where the receiving subscriber is located through a SIP network; and the AS #2 in the network where the receiving subscriber is located adds a ring tone #1 player program to the INVITE message in accordance with the reference #1 of the ring tone #1 as indicated by the subscriber and sends it to the receiving UE #2. The AS #2 may also add, delete or modify the contents in the INVITE message in accordance with the policy of the operator, the subscription of the receiving subscriber and the setting based on the subscription, herein the ring tone #1 may be added, deleted or modified.

S61)-S62) The UE1 generates the INVITE message carrying the reference #1 of the ring tone #1 stored in the AS #1 and sends the INVITE message to the S-CSCF #1.

S63) The S-CSCF #1 sends the INVITE message carrying the reference #1 of the AS #1.

S64) The AS #1 decides to send the INVITE message to the AS #2 without any further operation in accordance with the policy of the operator, the subscriber subscription and the subscriber setting based on the subscriber subscription.

S65)-S66) The AS #1 sends to the AS #2 the INVITE message carrying the reference #1 over the network.

S67) The AS #2 receives the INVITE message carrying the reference #1, and adds, deletes or modifies the contents in the INVITE message in accordance with the policy of the operator, the subscriber subscription and the subscriber setting based on the subscriber subscription. In the present embodiment, the AS #2 adds the ring tone #1 to the INVITE message in accordance with the reference #1 without any further operation.

S68)-S69) The AS #2 sends to the UE2 the INVITE message carrying the ring tone #1.

S610) The UE2 receives the INVITE message carrying the ring tone #1 for the UE2 subscriber, and plays the ring tone #1 if accepting the INVITE message.

S611) The subsequent process is completed in accordance with the session establishment flow.

In the sixth embodiment, the reference to the media contents may be a URI. The URI may represent a network identifier of a home network, a visited network, the network where the initiating subscriber is located or the network where the receiving subscriber is located. The network content processing entity that processes the message contents of the SIP message in accordance with a solution in the embodiment of the invention proceeds with processing in accordance with the attribute of the URI.

In S61)-S62), for example, if the reference #1 sent by the UE1 is the network identifier of the network where the receiving subscriber is located, in the process as described in the sixth embodiment, the reference #1 may be transferred to the network content processing entity in the network where the receiving subscriber is located for processing.

If the UE1 subscriber is located in a physical place of a visited network, the reference #1 sent by the UE1 to the visited network is a network identifier (i.e., a URI) of the UE home network. In this case, the visited network where the UE1 is located shall transfer the reference #1 to the home network to be processed by the network content processing entity in the home network. The INVITE message processed by the network content processing entity in the home network is sent from the home network to the network where the receiving subscriber is located.

The seventh embodiment: a process, in which the network content processing entity in the network where the receiving subscriber is located deletes and modifies a ring tone, is illustrated.

Figure 9:
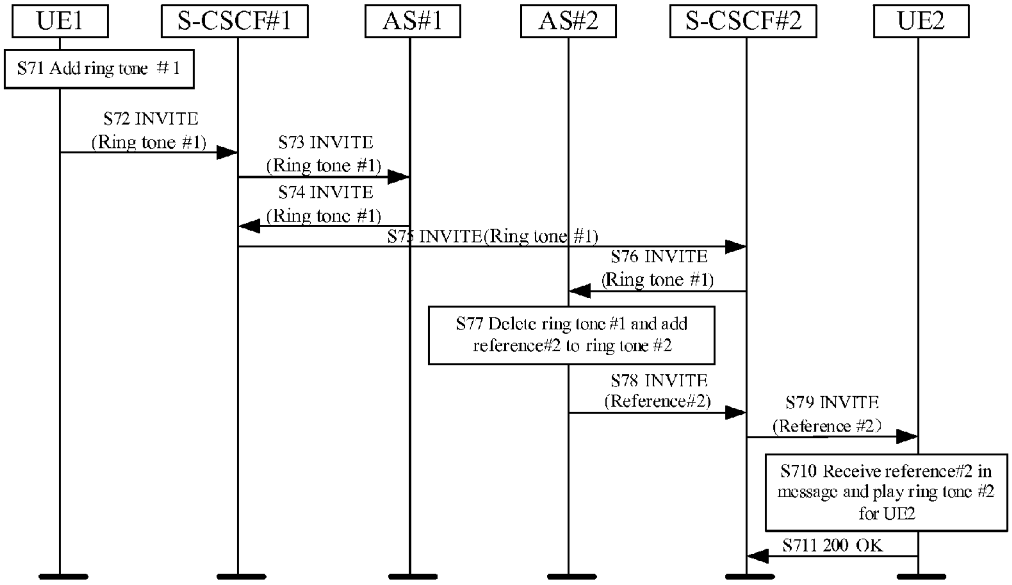
FIG. 9 is a schematic diagram of a flow in accordance with a seventh embodiment of the invention.
Figure 9A:
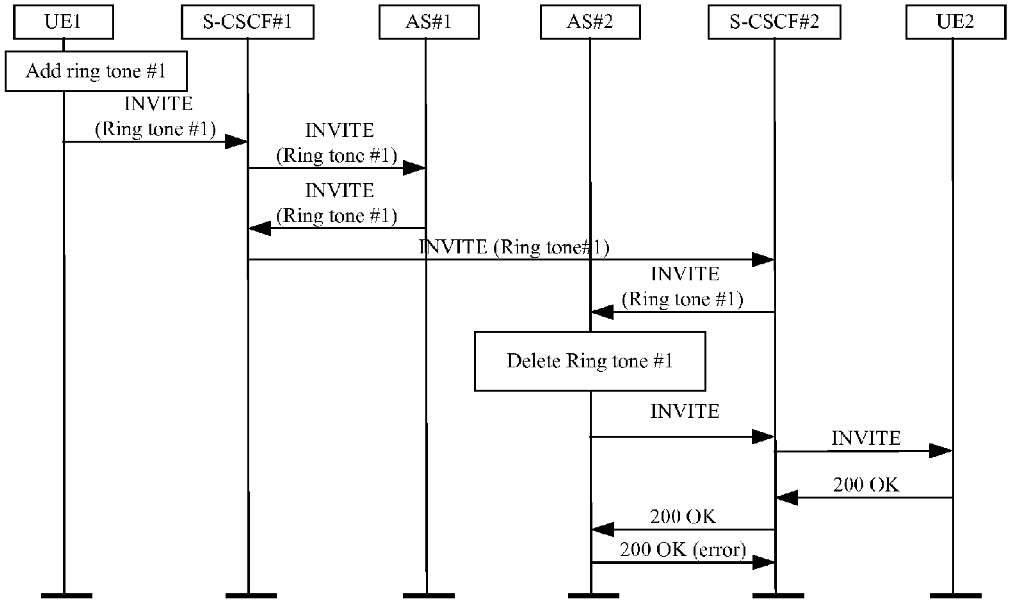
FIG. 9A is a schematic diagram of a flow in accordance with an embodiment 7A of the invention.
Figure 9B:
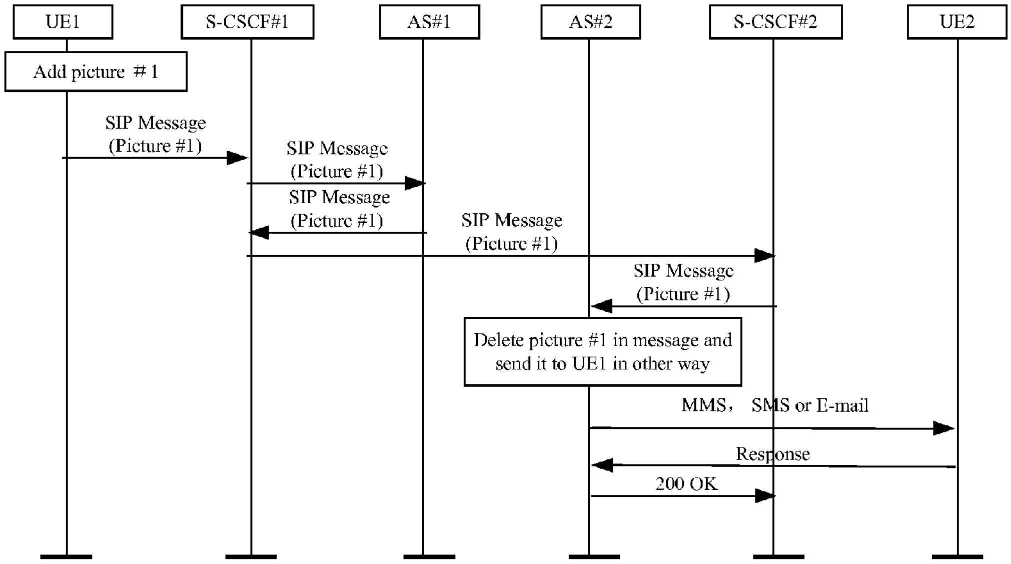
FIG. 9B is a schematic diagram of a flow in accordance with an embodiment 7B of the invention.

As illustrated in FIG. 9, the initiating UE1 sends an INVITE message carrying the ring tone #1, and when the INVITE message reaches the AS #2, the AS #2 deletes the ring tone #1 in accordance with the setting of the receiving subscriber and sends the reference #2 of the ring tone #2 stored in the UE #2. After deleting the ring tone, the network where the receiving subscriber is located may provide the initiating UE1 with a corresponding error indication in a response message.

S71)-S72) The UE1 generates an INVITE message carrying the ring tone #1 and sends the INVITE message to the S-CSCF #1.

S73) The S-CSCF #1 sends the INVITE message to the AS #1.

S74) The AS #1 decides to send the INVITE message to the AS #2 without any further operation in accordance with the policy of the operator, the subscriber subscription, and the subscriber setting based on the subscriber subscription.

S75)-S76) The AS #1 sends to the AS #2 the INVITE message carrying the ring tone #1 over the network.

S77) The AS #2 receives the INVITE message carrying the ring tone #1, and adds, deletes or modifies the contents in the INVITE message in accordance with the policy of the operator, the subscriber subscription and the setting based on the subscriber. In the present embodiment, the AS #2 can not send the ring tone #1 to the receiving UE2 in accordance with the policy of the operator and the setting of the subscriber, as a result, the ring tone #1 is deleted; and the AS #2 adds to the INVITE message the reference #2 of the ring tone #2 stored in the UE2 in accordance with the UE2 subscriber subscription.

S78)-S79) The AS #2 sends to the UE2 the INVITE message carrying the reference #2.

S710) The UE2 receives the INVITE message carrying the reference #2 and finds the ring tone #2; if the UE2 accepts the INVITE message, the UE2 plays the ring tone #2 for the UE2 subscriber.

S711) The subsequent process is completed in accordance with the session establishment flow.

In the embodiment of the invention, the ring tone #2 may also be added directly to the INVITE message in the step S77 without influence on implementing the invention.

In the above seventh embodiment, the reference to the ring tone #2 is sent to the UE2 after the ring tone #1 is deleted, and the UE2 plays the ring tone #2. In an embodiment 7A of the invention, the reference to the ring tone #2 may not be sent to the UE2, instead, an error indication is returned by the application server in the SIP network.

Figure 1:
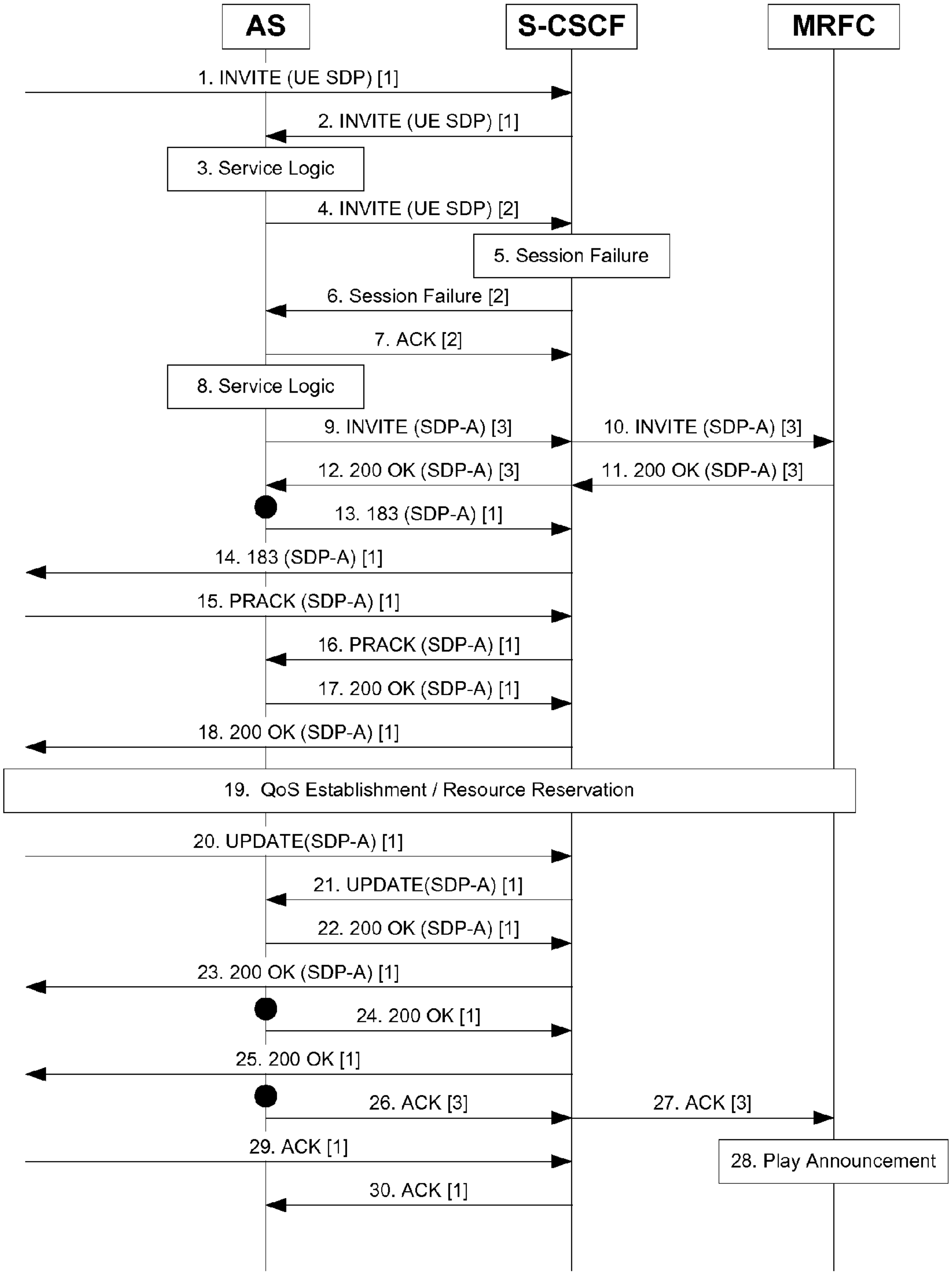
FIG. 1 is a schematic diagram of a flow in which an MRF plays a ring tone for a receiving User Equipment in the second prior art.

The Embodiment 7A:

In the present embodiment, the application server in the SIP network deletes the media contents in the SIP session establishment request, sends the SIP session establishment request without media contents to the receiver, and returns an error indication. As illustrated in FIG. 9-1, the steps in the present embodiment are similar to those illustrated in FIG. 9 in that the UE1 sends the session establishment request of INVITE message carrying the ring tone #1 and the AS #2 determines that the ring tone #1 can not be sent to the receiving User Equipment UE2 in accordance with the policy of the operator or the setting of the subscriber, but except that:

The AS #2 deletes the ring tone #1 in the SIP INVITE message and proceeds with sending the INVITE message to the receiving User Equipment UE2, and the receiving User Equipment UE2 is also instructed an alarm that the AS #2 deletes the ring tone #1. In the present embodiment, the initiating User Equipment UE1 may also be instructed the alarm that the AS #2 deletes the ring tone #1.

In the above seventh embodiment, the reference to the ring tone #2 is sent to the UE2 after the ring tone #1 is deleted, and the UE2 plays the ring tone #2. In the present embodiment, the UE2 can not play the ring tone #1 due to a limitation of the policy of the operator and the setting of the subscriber. In some actual situations, however, it is necessary to play the ring tone #1 at the UE2, which can be satisfied by an embodiment 7B of the invention.

The Embodiment 7B:

In the present embodiment, the application server in the SIP network deletes media contents in a SIP message, but sends the media contents to a message receiving equipment through another transmission approach in accordance with a content processing policy.

As illustrated in FIG. 9-2, in the present embodiment, the UE1 sending a SIP message sends a SIP message of MESSAGE, contents of which are a picture #1; Upon receipt of the SIP message, the Application Server (for example, a message processing server) in the SIP network deletes the picture #1 in the SIP message in accordance with the policy of the operator, the subscription of the subscriber or the setting of the subscriber. The Application Server itself stores the picture #1 temporarily and sends the picture #1 to the message receiving equipment UE2 through another transmission approach in accordance with the policy of the operator, the subscription of the subscriber and/or the setting of the subscriber. The other transmission approach may include an E-mail, an MMS or an SMS. The steps in the present embodiment are similar to those illustrated in FIG. 9 except that the deleted media contents are transmitted through the other transmission approach, and descriptions thereof are omitted herein for conciseness.

In the above embodiments, the ring tone or the picture is merely one type of media contents, and other types of media contents may be used in these embodiments and other embodiments of the invention without influence on implementing the invention.

The eighth embodiment: a process in which the application server adds media contents or a reference to media contents in accordance with the setting of the initiating subscriber is shown.

Figure 10:
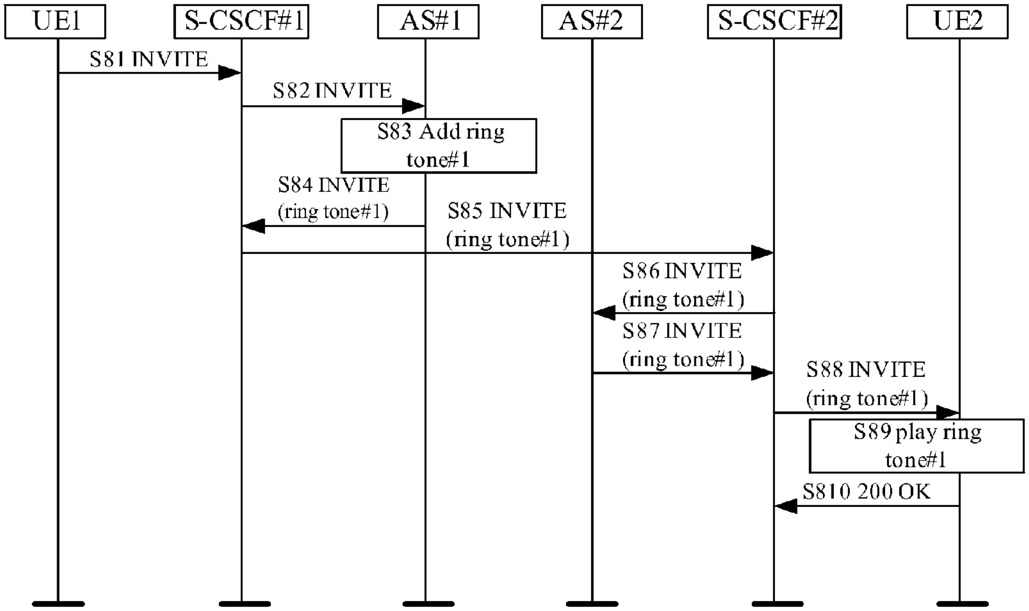
FIG. 10 is a schematic diagram of a flow in accordance with an eighth embodiment of the invention.

As illustrated in FIG. 10, the UE1 sends an INVITE message carrying no ring tone or reference to a ring tone, and the AS #1 adds a ring tone #1 to the INVITE message in accordance with the policy of the operator, the subscription of the subscriber and the subscriber setting based on the subscriber subscription and sends the INVITE message to the receiving UE2. If the UE2 accepts the INVITE message, the UE2 plays the ring tone #1. The Application Server adds media contents or a reference to media contents, and may also provide the sender with an error indication via a response message.

S81) The UE1 sends the INVITE message which may not carry the ring tone #1 and the reference #1.

S82-S83) The INVITE message is sent to the AS #1.

S84) The AS #1 adds the ring tone #1 to the INVITE message in accordance with the subscription of the subscriber.

S85)-S86) The AS #1 sends to the AS #2 the INVITE message carrying the ring tone #1.

S87-S88) The AS #2 receives the INVITE message carrying the ring tone #1 and adds, deletes or changes the contents in the INVITE message in accordance with the policy of the operator, the subscriber subscription and the subscriber setting based on the subscriber subscription. In the present embodiment, the AS #2 forwards the INVITE message to the receiving UE2 without performing any operation on the contents in the INVITE message.

S89) The UE2 receives the INVITE message carrying the ring tone #1. If accepting the INVITE message, the UE2 plays the ring tone #1 for the receiving subscriber.

S810) The receiving UE #2 returns a 200 OK, and the PoC system performs the subsequent process in accordance with the flow as specified in the criterions.

Figure 11:
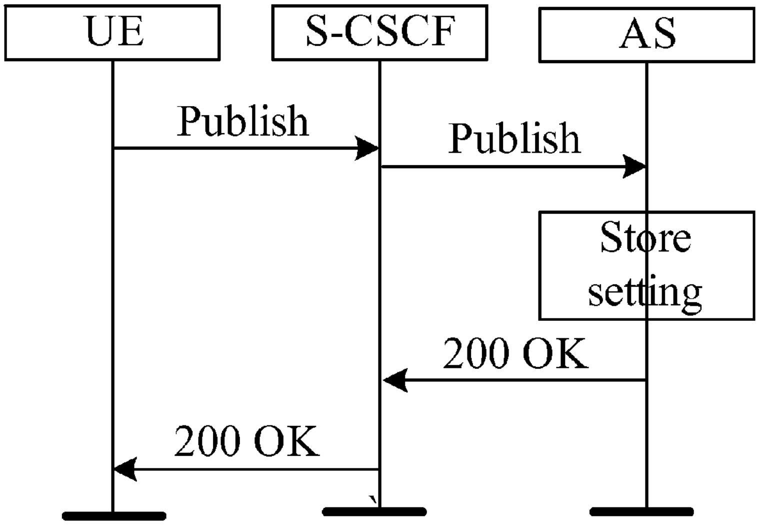
FIG. 11 is a schematic diagram of another flow in accordance with the eighth embodiment of the invention.

In the case of the AS, as illustrated in FIG. 11, a User Equipment may set the subscriber setting on the network content processing entity in a way that: the UE sends to the network a message of subscriber setting, such as a Publish and a UPDATE message, and the AS, upon receipt of the message of subscriber setting, checks whether the setting is valid and may be authenticated and stores the subscriber setting. Thereafter, the message contents of the INVITE message sent by the UE to the AS are processed in accordance with the subscriber setting stored in the AS. The subscriber setting sent by the UE to the AS may be a restraint on specific message contents of the SIP message forwarded by the AS to the UE, and the restraint may be implemented by limiting the size of the message contents, or deleting the specific message contents.

The subscriber setting sent by the UE to the AS may be a reference to media contents. The AS receives the INVITE message sent by the UE, and adds the reference to the media contents to the INVITE message. The reference to the media contents may be a serial number of the media contents.

In the above embodiments, the SIP network content processing entity to which the sender of the SIP message pertains or the SIP network content processing entity to which the receiver of the SIP message pertains may act respectively as the network content processing entity, so as to implement the invention. Alternatively, the SIP network content processing entity to which the sender of the SIP message pertains and the SIP network content processing entity to which the receiver of the SIP message pertains may perform respectively the processing steps in the above embodiments sequentially, without influence on implementing the invention.

The ninth embodiment provides a process in which the SIP network changes service supporting capability information in a session negotiation message is illustrated.

In accordance with a description method as specified in the SDP protocol, service supporting capability information such as session information and media information related to the present session may be described in a session negotiation message. The SIP network may change the service supporting capability information in accordance with the policy of the operator and under the control of the policy of the operator. The method for describing the service capability support information may also include other methods in addition to the description method of the SDP protocol, for example, the information is described in a SIP message using an XML audio, or the information is described in a SIP message using the SCRIPT language, or other service supporting capability description methods allowable in a SIP message.

Descriptions of how the SIP network changes an SDP parameter in a session negotiation message in accordance with the policy of the operator is presented below in the case that the policy of the operator specifies that the receiving subscriber may enjoy special fee rates and obtain extra benefits of activities organized by the operator when the receiving subscriber uses certain SDP parameter configurations related to the present session.

The policy of the operator is described briefly as follows. The subscriber who selects a high-quality multimedia service during a session negotiation needs pay an extra fee for a quality guarantee of a high bandwidth provided by the operator for the subscriber, but the operator provides extra benefits, such as an extra score, extra back-off to subscriber and a donated gift, for the subscriber who uses the high-quality multimedia service. To carry out the policy of the operator in the SIP network, SDP parameters descriptive of service support capabilities of the high-quality multimedia service supported by the SIP network are added to the session negotiation message. Therefore, the receiver may get choices. The receiver, for example, the receiving User Equipment, selects the service support capabilities described in the newly added SDP parameters and proceeds with the session negotiation.

Figure 12:
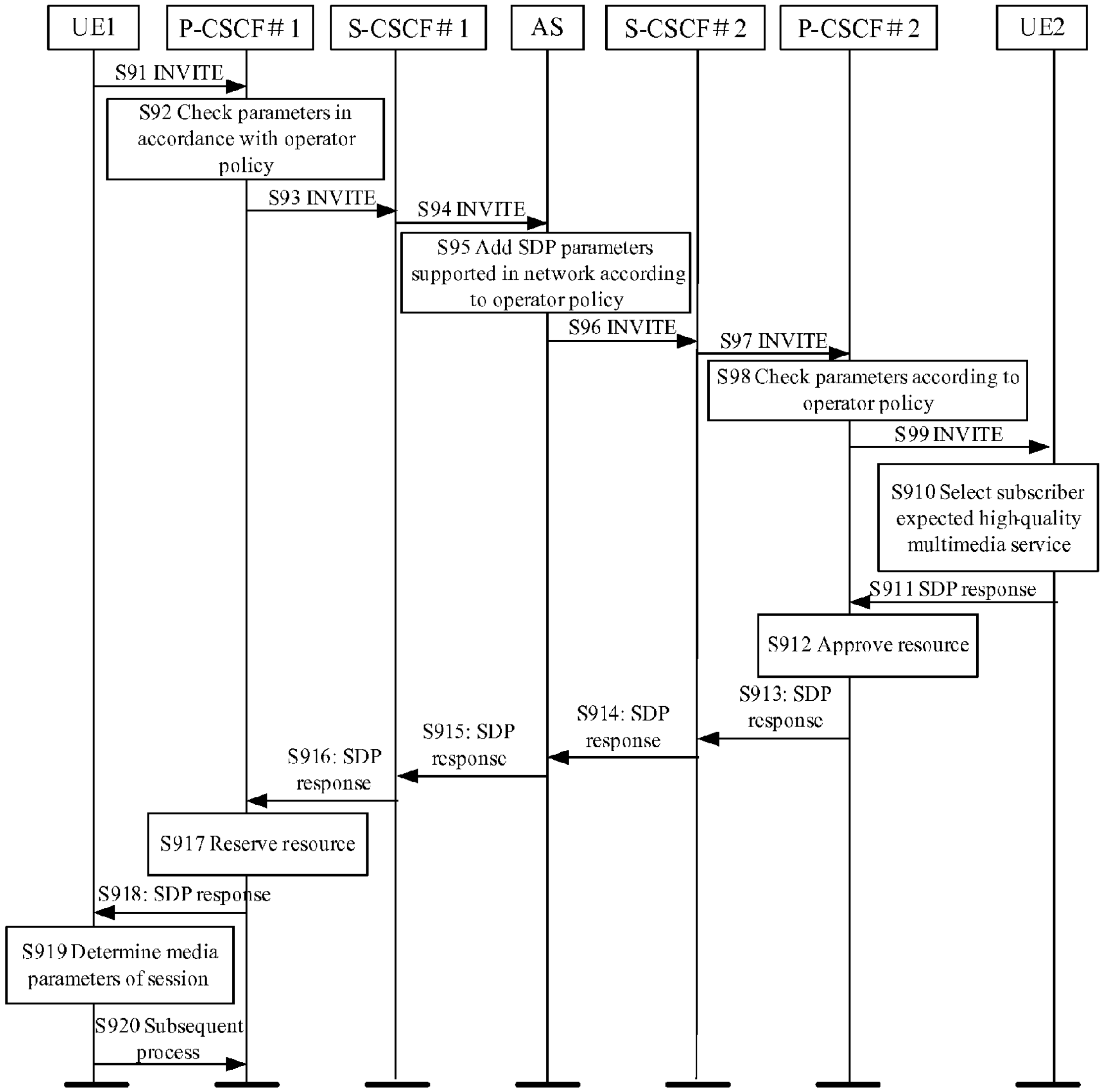
FIG. 12 is a schematic diagram of a flow in accordance with a ninth embodiment of the invention.

FIG. 12 shows a process in which SDP parameters to be selected by the receiver are added in the SIP network in accordance with the policy of the operator. As illustrated in FIG. 12, the AS in the SIP network cooperates with other network entities, and provides the receiver of a session negotiation message with SDP parameters for selection in accordance with the policy of the operator, so that the receiver may select a high-quality multimedia service allowable by the policy of the operator. In the descriptions of the procedure, it is assumed that a high-quality multimedia service selected by the receiver at last may be used for all of subscription data of the subscriber participating the session negotiation, and after the receiver selects the high-quality service, the selection is recorded in a charging system as well as in an operation system of the operator.

S91) A session establishment request (an INVITE message) sent by the UE1 carries service support capabilities described in the SDP protocol and is sent to the P-CSCF #1. The UE1 adds a coding parameter in an SDP payload, and the coding parameter implies the service support capabilities of the UE1 and a coding parameter expected in a session.

S92) The P-CSCF1 checks media parameter information described in the SDP description.

S93) The P-CSCF #1 forwards the INVITE message to the S-CSCF #1.

S94) The S-CSCF #1 allows the media parameters described in SDP and media parameters of a high-quality multimedia service to be used by the UE1 in the session, and the S-CSCF #1 forwards the INVITE message to the AS.

S95) In accordance with the policy of the operator, the AS adds to the INVITE message the media parameters that are supported by the SIP network supported and used for providing the high-quality multimedia service.

S96) The AS sends the changed INVITE message to the S-CSCF #2 to which the UE2 pertains.

S97) The S-CSCF #2 allows the changed media parameters described in the SDP to be used by the UE2 in the session, and the S-CSCF #2 forwards the INVITE message to the P-CSCF #2.

S98) The P-CSCF #1 checks the media parameters information described in SDP.

S99) The P-CSCF #1 forwards the INVITE message to the UE2.

S910) The receiving UE2 selects the expected media parameters, i.e., the media parameters required for using the high-quality multimedia service that are provided in accordance with the policy of the operator.

S911) The UE2 returns to the P-CSCF #2 an SDP response, i.e., the selected media parameters.

S912) The P-CSCF #2 approves to reserve a QoS resource related to these media parameters.

S913) The P-CSCF #2 forwards the SDP response to the S-CSCF #2.

S914) The S-CSCF #2 forwards the SDP response to the AS. Therefore, the AS may obtain the media parameters used for the present session and record information on the service quality used for the present session in accordance with the policy of the operator.

S915) The AS forwards the SDP response to the S-CSCF #1.

S916) The S-CSCF #1 forwards the SDP response to the P-CSCF #1.

S917) The P-CSCF #1 approves to reserve the QoS resource for the use of these media parameters.

S918) An approval token is included in the SDP description, and the P-CSCF forwards the SDP response to the UE#1.

S919) The UE1 finally determines the media parameters used for the present session.

S920) The UE1 sends an SDP suggestion and carries out an operation at the next step.

In this way, the AS in the SIP network cooperates with the other network entities to change the service supporting capability information described in the SDP in accordance with the policy of the operator, and accomplishes the function as requested in the policy of the operator.

In the technical solution, the policy of the operator may be embodied in a way that: the policy of the operator may specify that the network entity may restrain message contents of a SIP message from being sent to the UE, where the operator may remove part of the message contents of the SIP message due to a certain policy.

The operator may forbid sending message contents to the UE in a way that: part of the message contents may be deleted in accordance with the policy of the operator, or in the case that the User Equipment does not support playing the message contents, particularly media contents, the network content processing entity deletes directly the part of the media contents which is not supported. Alternatively, the network content processing entity may store the part of the media contents for the User Equipment, and the User Equipment may obtain the restrained part of the media contents in another way. For example, the network content processing entity may send the part of the message contents to an Email address of the subscriber, send the part of message contents to the User Equipment via an MMS, send the part of message contents to the User Equipment via an SMS, or store the part of message contents to a Web page which is set up for the subscriber.

In the embodiments of the invention, message contents of a SIP message may be changed in accordance with a request of the initiating and receiving subscribers and the policy of the operator during a session negotiation, and the changeable message contents may be various types of multimedia contents.

It is apparent that those skilled in the art can make various modifications and variations of the invention without departing from the spirit and scope of the invention. Accordingly, the invention is intended to encompass all the modifications and variations provided that these modifications and variations fall within the scope of the claims appended to the invention and their equivalents, including all foreseeable equivalents to the elements disclosed in FIGS. 2-12.

The invention claimed is:

1. A method for processing contents of a SIP message prior to being delivered to a User Equipment, comprising the steps of:

receiving a SIP message by a SIP network content processing entity;

determining, by the SIP network content processing entity, whether a message content management policy allows processing of a media component in the SIP message;

processing, by the SIP network content processing entity, the media component in the SIP message if the message content management policy allows processing of the media component in the SIP message, wherein the processing comprises at least one of adding, modifying and deleting;

sending, by the SIP network content processing entity, the SIP message carrying the processed media component from the SIP network content processing entity to the User Equipment; and wherein the media component comprises a reference to a media content, further comprising:

determining, by the SIP network content processing entity, whether the message content management policy allows the reference to the media content in the SIP message to be deleted, and if the message content management policy allows the reference to the media content in the SIP message to be deleted, deleting the reference to the media content in the SIP message in accordance with the message content management policy.

2. The method according to claim 1, wherein the media component comprises a media content or a reference to a media content.

3. The method according to claim 2, wherein the SIP message carries a request for processing the media content and the reference to the media content; and corresponding media content is processed in accordance with the request and the reference carried in the SIP message.

4. The method according to claim 3, wherein the reference to the media content is a serial number of the media content or a Uniform Resource Identifier (URI) of the media content.

5. The method according to claim 2, wherein the media content and a corresponding relationship between the media content and the corresponding reference are stored in advance in the SIP network content processing entity, and the SIP message carrying a request for processing the media content and the reference to the media content; and corresponding media content is processed in accordance with the request and the reference carried in the SIP message.

6. The method according to claim 2, wherein a SIP message receiver stores in advance the media content and a corresponding relationship between the media content and the corresponding reference, and the adding the media component comprises:

adding a reference to a new media content to the SIP message, wherein after the SIP message receiver receives the SIP message, the method further comprises the step of:

fetching, by the SIP message receiver, corresponding media content in accordance with the reference in the SIP message, and playing the media content.

7. The method according to claim 1, wherein the message content management policy is set in the SIP network content processing entity.

8. The method according to claim 7, further comprising the steps of: sending in advance, by a User Equipment, a setting message to the SIP network content processing entity;

determining, by the SIP network content processing entity, whether a setting carried in the setting message is valid; and storing the setting carried in the setting message if the setting is valid.

9. The method according to claim 1, wherein the step of processing comprises deleting the media component when the media component is not supported by a receiver.

10. The method according to claim 1, wherein the adding the media component comprises adding a new media content in the SIP message.

11. The method according to claim 1, wherein the media component comprises a reference to a media content, further comprising:

determining, by the SIP network content processing entity, whether the message content management policy allows adding of the reference to the media content to the SIP message, and if the message content management policy allows adding of the reference to the media content to the SIP message, adding the reference to corresponding media content to the SIP message in accordance with the message content management policy, wherein after a SIP message receiver receives the SIP message, the method further comprises the step of:

fetching, by the SIP message receiver, corresponding media content in accordance with the reference in the SIP message, and playing the media content.

12. The method according to claim 1, wherein the SIP network content processing entity is located in a SIP network to which an initiating subscriber pertains or a SIP network to which a receiving subscriber pertains, or a SIP network to which both the initiating subscriber and the receiving subscriber pertain.

13. The method according to claim 2, when the media component comprises a media content, and wherein the message content management policy is to restrain the media content from being sent to a SIP message receiver; and the step of processing comprises deleting the media content from the SIP message.

14. The method according to claim 13, after deleting the message content in the SIP message, further comprising the step of:

storing, by the SIP network content processing entity, the deleted message content, and obtaining, by the SIP message receiver, the deleted message content through a transmission approach other than the SIP message.

15. The method according to claim 1, wherein the message content management policy comprises at least one of an operator policy, subscriber subscription information and a setting based on the subscriber subscription information.

16. The method according to claim 1, wherein the SIP message is an INVITE message.

17. A network for processing contents of a SIP message, comprising a SIP network content processing entity configured to process contents of a SIP message prior to being delivered to a User Equipment, wherein the SIP network content processing entity comprises:

a content management policy obtaining unit adapted to obtain and provide a message content management policy to a media information setting unit; and the media information setting unit adapted to process a media component in a SIP message sent from a User Equipment in accordance with the message content management policy, wherein the processing comprises at least one of adding, modifying and deleting;

a sender adapted to send a SIP message carrying the processed media component to another User Equipment; and wherein the media component comprises a reference to a media content, further comprising:

determining, by the SIP network content processing entity, whether the message content management policy allows the reference to the media content in the SIP message to be deleted, and if the message content management policy allows the reference to the media content in the SIP message to be deleted, deleting the reference to the media content in the SIP message in accordance with the message content management policy.

18. The network according to claim 17, wherein the network content processing entity comprises a Call Session Control Function, a Multimedia Resource Function or an Application Server.

19. The network according to claim 18, wherein the Application Server comprises a PoC server controlling a Push to Talk over Cellular service function, a PoC server participating in controlling a PoC service control function, a Conference Server, an Service Capability Interaction Manager or a Presence Server or a Converged IP Messaging server.

20. The network according to claim 19, wherein the SIP network processing entity is located in a SIP network to which a sender of the SIP message pertains, a SIP network to which a receiver of the SIP message pertains, or a SIP network to which both the sender and the receiver of the SIP message pertain or an intermediate SIP network the SIP message traverses.

21. A network for processing contents of a SIP message, comprising a SIP network content processing entity configured to process contents of a SIP message prior to being delivered to a User Equipment, wherein the SIP network content processing entity is configured to:

receive a SIP message;

determine whether a message content management policy allows to process a media component in the SIP message;

process the media component in the SIP message if the message content management policy allows to process the media component in the SIP message, wherein the processing comprises at least one of adding, modifying and deleting;

send a SIP message carrying the processed media component to the User Equipment; and wherein the media component comprises a reference to a media content, further comprising:

determining, by the SIP network content processing entity, whether the message content management policy allows the reference to the media content in the SIP message to be deleted, and if the message content management policy allows the reference to the media content in the SIP message to be deleted, deleting the reference to the media content in the SIP message in accordance with the message content management policy.

* * * * *